United States Patent
Matsumoto

[11] Patent Number: 5,551,348
[45] Date of Patent: Sep. 3, 1996

[54] AUTOMATIC CONVEYANCE SYSTEM

[75] Inventor: Hajime Matsumoto, Itami, Japan

[73] Assignee: Mitsubishi Denki Kabushiki Kaisha, Tokyo, Japan

[21] Appl. No.: 996,604

[22] Filed: Dec. 24, 1992

[30] Foreign Application Priority Data

Dec. 27, 1991 [JP] Japan .................. 3-346476

[51] Int. Cl.$^6$ ............................................. B61L 1/00
[52] U.S. Cl. ................................. 104/88.02; 246/220
[58] Field of Search .................... 104/88, 89, 91; 901/1; 246/219, 220, 167 A, 34 A

[56] References Cited

U.S. PATENT DOCUMENTS

| | | | |
|---|---|---|---|
| 3,263,073 | 7/1966 | Westerweel | 104/88 |
| 3,318,260 | 5/1967 | Gillespie | 104/88 |
| 3,848,535 | 11/1974 | Mitchell | 104/88 |
| 3,889,797 | 6/1975 | Naito et al. | 198/35 |
| 4,372,218 | 2/1983 | Ostlund | 104/88 |
| 4,669,047 | 5/1987 | Chucta | 104/88 |
| 4,726,299 | 2/1988 | Anderson | 104/88 |
| 4,766,547 | 8/1988 | Modery et al. | 104/88 |
| 4,791,871 | 12/1988 | Mowll | 104/88 |
| 5,015,145 | 5/1991 | Angell et al. | 901/1 |
| 5,031,109 | 7/1991 | Gloton | 901/1 |
| 5,063,857 | 11/1991 | Kissel | 104/88 |
| 5,080,019 | 1/1992 | Takemura et al. | 104/88 |
| 5,156,513 | 10/1992 | Galan et al. | 901/1 |
| 5,211,523 | 5/1993 | Galan et al. | 901/1 |
| 5,332,013 | 7/1994 | Sugita et al. | 901/1 |

FOREIGN PATENT DOCUMENTS

| | | | |
|---|---|---|---|
| 2262210 | 12/1972 | Germany. | |
| 3540316 | 11/1985 | Germany. | |
| 3544705 | 7/1986 | Germany | 104/88 |
| 548334 | 2/1973 | Switzerland. | |
| 8304404 | 12/1983 | WIPO. | |
| 8606303 | 11/1986 | WIPO | 104/88 |

*Primary Examiner*—Mark T. Le
*Attorney, Agent, or Firm*—Leydig, Voit & Mayer

[57] ABSTRACT

An automatic conveying system includes a main loop-like conveying track, a plurality of auxiliary loop-like conveying tracks along the main conveying track for selective coupling and de-coupling by couplers to and from the main track, and a plurality of auxiliary conveying vehicles for running along the main and auxiliary tracks. Each conveying vehicle can run continuously along the main and auxiliary tracks with switching by the couplers. The system permits reduction or elimination of intermediate loading and unloading operations or waiting times for changing vehicles, thus increasing the efficiency of conveyance. In addition, such equipment as stockers or loading and unloading machines for tentatively stocking cargo for changing vehicles and for loading and unloading operations during conveyance can be reduced or eliminated, thus minimizing the installation space for such equipment. This permits effective utilization of factory premises and good layout of the factory with a high space utilization-factor.

5 Claims, 6 Drawing Sheets

AUTOMATIC CONVEYANCE SYSTEM

BACKGROUND OF THE INVENTION

This invention relates to an automatic conveyance system for automatically conveying cargo such as machine or electrical parts for assembly, raw materials, partially fabricated products and the like between a plurality of places in an assembling, processing or production plant, factory or the like, in which assembling, processing or production apparatus are disposed.

Automation has been advanced in production lines connecting a number of production areas with many assembling, processing or production apparatus (hereinafter referred to simply as production apparatus) installed therein for conveying cargo such as raw materials, parts, partially finished products and the like among the apparatus. In general, a production line includes a plurality of production areas, and one or more production apparatus are installed in each production area.

FIG. 7 is a schematic plan view outlining a prior art conveying system. This prior art conveying system includes a plurality of production areas in which various production apparatus 101 are installed, a plurality of production area conveying systems 105 one for each production area for conveying cargo such as parts, partially finished products, etc., within each production area, and also a main or inter-area conveying system 107 for conveying cargo among the plurality of production areas. Each production area conveying system 105 includes a production, area track 109 installed on its floor connecting the production apparatus 101 installed within each production area, a production area conveying vehicle 111 which runs along the production area track 109 for conveying cargo to be used for production, and a cargo transfer unit 113 at one end of the production area track 109 for transferring cargo between the production area conveying system 105 and the main conveying system 107. The main conveying system 107 includes a straight or rectilinear main track 115 which is provided to connect all the production areas 105 and which is used mainly when there is a long distance between a source area and a destination area where respective production apparatus 101 are present, a main conveying vehicle 117 which runs along the main track 118, a plurality of auxiliary tracks 118 which are provided near and in parallel with the main track 115 so as to connect a plurality of production areas 105 comparatively close to one another and which are used mainly when there is a short distance between a source area and a destination area where respective production apparatus 101 are present, and auxiliary conveying vehicles 119 which run along the auxiliary tracks 118.

A sequence of conveyance will now be described in connection with the case when cargo such as parts, partially fabricated products, etc., is conveyed from a production apparatus 101-1 in one production area 105 (e.g., a bottom left one in FIG. 7) a different production apparatus 101-2 in another production area 105 (e.g., a top right one in FIG. 7) relatively distant therefrom.

In the source production area, the cargo is loaded on the production area conveying vehicle 111-1 from a production apparatus 101-1 this area and then conveyed by the conveying vehicle 111-1 along a track 109-1 to a cargo transfer unit 113-1 at one end the track. At the cargo transfer unit 113-1, the cargo is transferred to an auxiliary conveying vehicle 119 of a nearby production area conveying system 107 and conveyed to the neighborhood of a nearby cargo transfer unit 115-1 on the main track 115 for transfer no the main conveying vehicle 117. Then, the main conveying vehicle 117 is moved along the main track 115 to the nearest cargo transfer unit 115-2 on the main track 115 to the destination production area, in which a destination production apparatus 101-2 is present. At the cargo transfer unit 115-2, the cargo is transferred to an auxiliary conveying vehicle 119 and then conveyed to the neighborhood of a cargo transfer unit 113-2 at one end of the track 109-2 in the destination production area. In this cargo transfer unit 113-2, the cargo is transferred to the production area conveying vehicle 111-9, and conveyed along the track 109-2 to the destination production apparatus 101-2.

In the production line provided with a plurality of such conveying systems 105 and 107, the cargo used for the production, when conveyed between two distant production areas, is subject to loading and unloading operations not only at the source and destination production apparatus 101-1 and 101-2 but also at a plurality of intermediate cargo transfer units 113-1, 115-1, 115-2 and 113-2.

Thus, with the above-mentioned prior art conveying system, when cargo is conveyed between two distant production areas, it is conveyed by a plurality of conveying vehicles 111-1, 119, 117, 119, and 111-2 from the source production apparatus 101-1 to the destination production apparatus 101-2. Therefore, many loading and unloading operations are required at a plurality of cargo transfer units 113-1, 115-1, 115-2 and 113-2, i.e., between the production area conveying vehicle 111-1 in the source area and an auxiliary conveying vehicle 119 near this area, between this vehicle 119 and the main conveying vehicle 117, between this vehicle 117 and an auxiliary conveying vehicle near the destination area, and between this vehicle 119 and the production area conveying vehicle 111 in the destination area. In addition, depending on the traffic situations of the individual conveying vehicles, it is necessary to wait for transfer between vehicles. Due to such loading and unloading operations as well as waiting times, a long time is required for the entire conveyance. Further, when it becomes necessary for the cargo to wait for vehicle transfer, the cargo has to be tentatively stocked for a while at each transfer site. This requires stockers and stocking or storage spaces, thus increasing the necessary equipment in the factory, which Is undesirable from the standpoint of effective space utilization within the factory premises.

SUMMARY OF THE INVENTION

This invention seeks to solve the above-mentioned problems encountered with the conventional cargo conveying system.

An object of the invention is to provide an automatic conveying system which permits reduction or elimination of intermediate loading and unloading operations as well as waiting times for transfer between vehicles during conveyance from a source production apparatus to a destination production apparatus, thereby enhancing conveyance efficiency.

Another object of the invention is provide an automatic conveying system which permits reduction or elimination of equipment for temporarily stocking cargo, for loading and unloading operations, or waiting for vehicle transfer as well as reduction or elimination of the space for installation of such equipment to thereby provide for effective utilization of the space in a factory.

To attain the above objects of the invention, according to the present invention, there is provided an automatic conveyance system which comprises: main loop-shaped conveying track; a plurality of auxiliary loop-shaped conveying tracks provided along the main conveying track and selectively coupled to and de-coupled from the main conveying track by means of couplers; and a plurality of conveying vehicles running on the main and auxiliary conveying tracks, each of tile conveying vehicles being able to run continuously on the main conveying track and any of the auxiliary conveying tracks coupled thereto with the switching by the couplers of the state connection between the main and auxiliary conveying tracks.

Each of the auxiliary tracks is coupled to the main track through a corresponding one of the couplers to form a joining point and a branching point. The system further comprises: a signaling unit disposed at a position slightly before each joining point of the main and auxiliary tracks for controlling the vehicles passing the corresponding joining point; a passage sensor disposed before each joining point for sensing a conveying vehicle approaching the corresponding joining point and generating an output signal indicative of the passage of the approaching conveying vehicle when the latter passes a predetermined location before the corresponding joining point; and signal control means connected to receive the output signals from the passage sensors for supplying control signals to the signaling units based on information about the passages of the vehicles sensed by the passage sensors, so that the vehicles approaching each joining point can be controlled by the signaling units to avoid collision with each other.

Preferably, the signal control means controls the vehicles passing each joining point through the signaling units in such a manner that priority is given to a vehicle on the main track rather than a vehicle on the auxiliary tracks when these vehicles are about to concurrently pass each joining point.

Preferably, the signaling units are disposed along the main and auxiliary tracks, and the passage sensors are disposed along the main track.

Preferably, the automatic conveyance system further comprises: conveyance control seats for supplying information for designating source and destination production apparatus to the vehicles and for controlling overall conveyance operation of the vehicles; and production apparatus control means connected to the production apparatus for controlling the production apparatus.

With the automatic conveying system of the invention as defined above, when cargo such as materials, parts, partially fabricated products and the like used for production is conveyed from a source production area to a destination production area along different auxiliary conveying tracks, the source and destination auxiliary tracks are coupled by the couplers to the main track, thus permitting the conveying vehicle with the cargo loaded thereon to proceed from the source-side auxiliary track to the main track via a coupler, then run on the main track to a coupler of the destination-side auxiliary track, and continuously run from the main track to the destination-side auxiliary track via the associated coupler. Thus, the vehicle can go to the destination without the need of any loading and unloading of the cargo at intermediate points, and it is thus possible to realize very efficient conveyance of cargo.

DESCRIPTION OF THE DRAWINGS

The above and other objects, features and advantages of the invention will become more readily apparent when the following description is read with reference to the accompanying drawings, in which.

DETAILED DESCRIPTION OF THE PREFERRED EMBODIMENT

Now, a preferred embodiment of the invention will be described with reference to the accompanying drawings.

Figure 1:
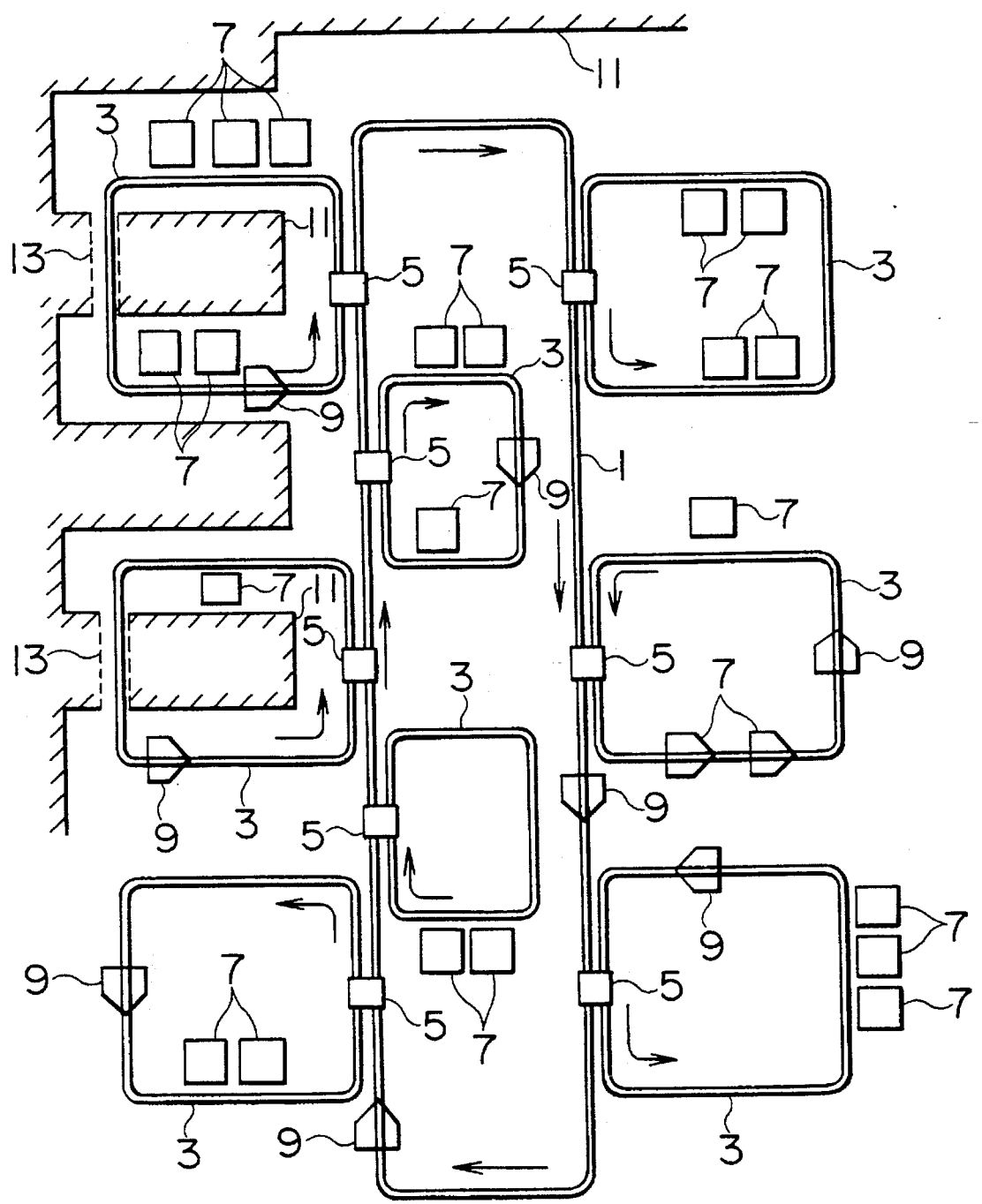
FIG. 1 is a schematic plan view showing an automatic conveyance system according to the invention.
Figure 2:
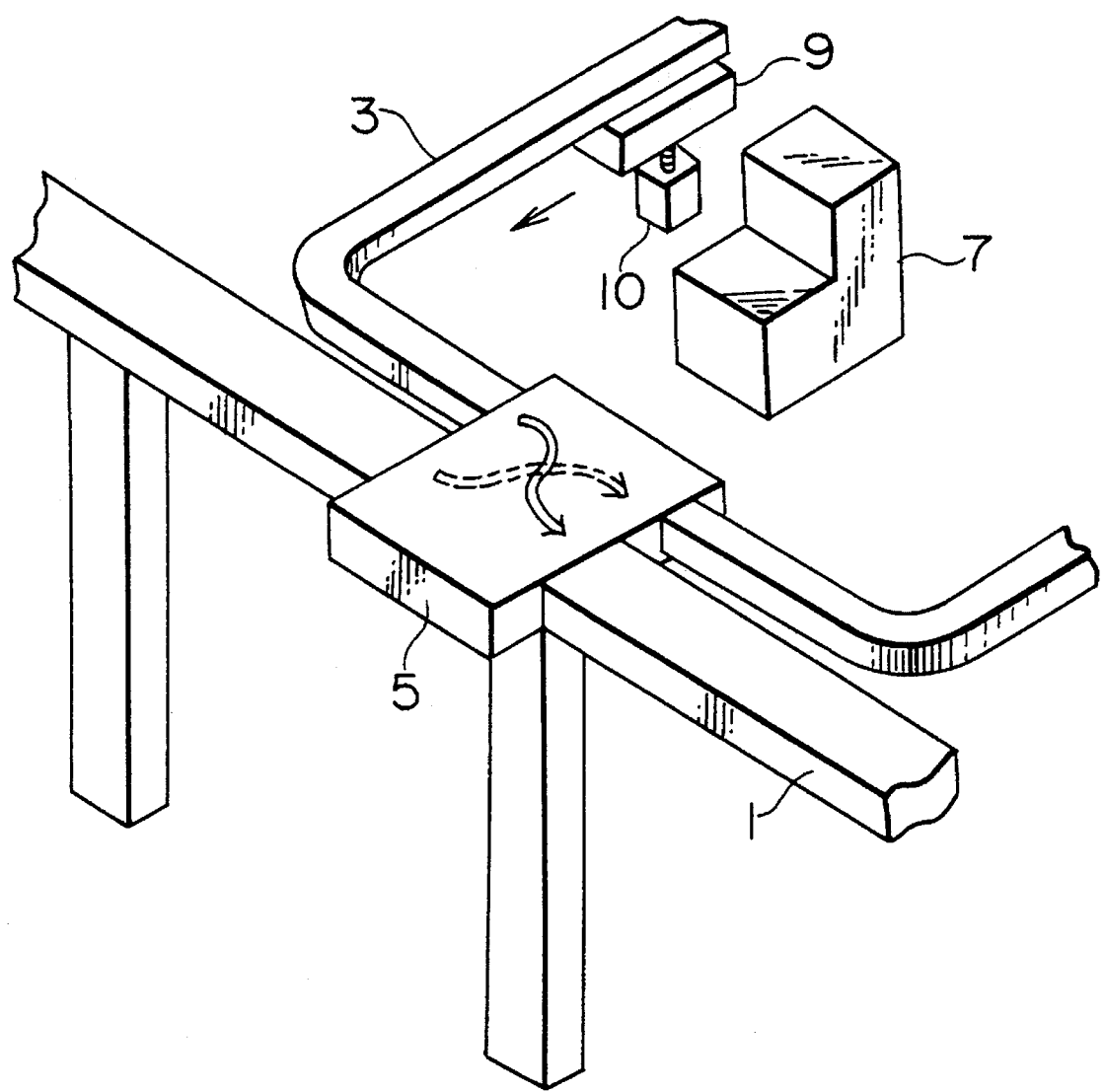
FIG. 2 is an enlarged-scale fragmentary schematic perspective view of the automatic conveyance system shown in FIG. 1.

As shown in FIG. 1, a main conveying track in the shape of a substantially rectangular loop is installed on the ceiling of a plant or factory. On the inner add outer sides of this loop-like main conveying track 1, a plurality of auxiliary conveying tracks 3 each in the shape of a substantially rectangular loop are installed on the ceiling along the main track 1. Each auxiliary track 3 is selectively coupled to and de-coupled from the main track 1 by a coupler 5. Disposed along the individual auxiliary tracks are a plurality of production apparatus 7 for performing predetermined processing on cargo such as raw materials, parts, partially fabricated products, etc., which has been conveyed to them. A conveying vehicle 9 runs on each auxiliary track 3. Each conveying vehicle 9 is provided with a handling unit shown) for loading and unloading cargo 10 (see FIG. 2). It can not only run along each looped auxiliary track 3, but also be transferred from each auxiliary track 3 to the main track 1 or vice versa by an associated coupler 5. A desired auxiliary track 3 can be coupled to the main track 1 by means of an associated coupler 5, so that cargo to be used for production can be conveyed from a given production apparatus in a source production area to a given production apparatus 7 in a destination production area within the factory with a single conveying vehicle 9 alone without the need of changing vehicles and without loading and unloading operations at intermediate sites. The couplers 5 may be of any structure so long as they can selectively control (i.e., break or establish) the state of connection between the main track, 1 and the associated auxiliary tracks 3: for instance, it may be a well-known railroad point or switch used for switching railroad tracks.

Since a plurality of vehicles 5 are running in the factory, one-way traffic is adopted for the main and auxiliary tracks 1 and 3 to simplify control for avoiding collision or congestion of vehicles 9 on the main and auxiliary tracks 1 and 3.

An inner side wall 11 of the factory may not always be free from any projecting or recessed portions, but it may have projections and recesses, as shown in FIG. 1. In such a case, some of the auxiliary tracks 3 may partly pass through passages 13 called clean tunnels which are formed through inwardly projecting portions of the inner wall 11. In this way, it becomes possible to freely lay out the routes of the main and auxiliary tracks 1 and 3 without regard to the configuration of the inner wall 11 of the factory.

Figure 3:
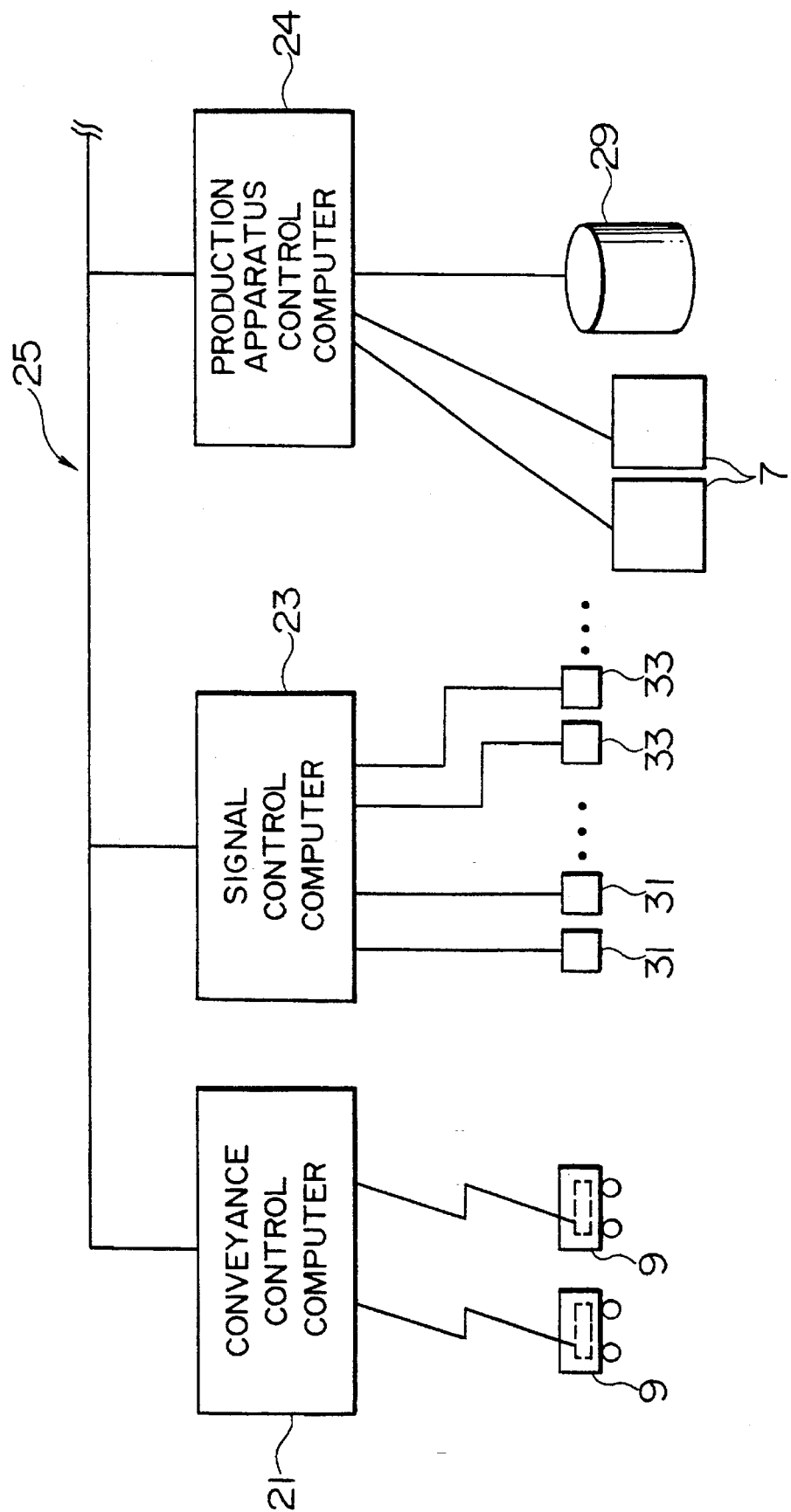
FIG. 3 is a schematic representation of an overall control system in the automatic conveyance system shown in FIG. 1.

Now, a control system for the automatic conveying system having the above construction will be described. FIG. 3 schematically shows the control system of the automatic conveying system according to the invention. The conveying vehicles 9 are able to communicate via radio waves with a conveyance control means in the form of a computer 21 for controlling the overall conveyance. The computer 21 provides information designating source and destination production apparatus 7 to the individual conveying vehicles 9. A plurality of signaling units and a plurality of passage sensors 33 (see FIG. 5) are connected to a signal control means in the form of a computer 28. The signal control computer 23 provides control signals to the signaling units 31 based on passage information about the passages of conveying vehicles 9 given by the passage sensors 33, as will be described later in detail, for controlling traffic of the vehicles 9. The conveyance control computer 21 and the signal control computer 23 are able to communicate with each other via a LAN (local area network) 25. These computers 21 and 23 have respective data bases concerning production routines and they are connected via the LAN 25 to a production apparatus control means in the form of a computer 27, which performs overall control of the production apparatus 7.

Figure 4:
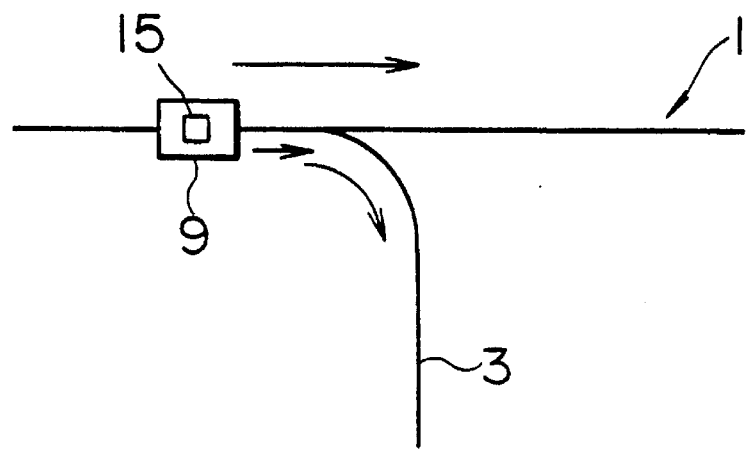
FIG. 4 is a schematic plan view showing an area including a branching point on conveying tracks for schematically illustrating a method of traffic control on conveying vehicles at the branching point according to the invention.
Figure 5:
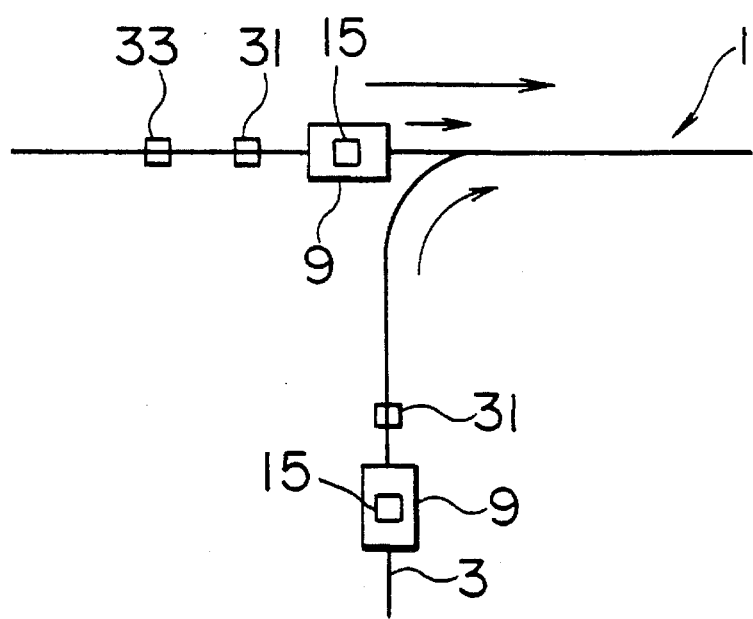
FIG. 5 is a schematic plan view showing an area including a joining point on conveying tracks for illustrating a method of traffic control on conveying vehicles at the joining point according to the invention.

FIGS. 4 and 5 schematically show, on an enlarged scale, areas near a coupler 5 for coupling an auxiliary track 3 to the main track 1. More specifically, FIG. 4 shows the status of the routes in which an auxiliary track 3 branches from the main track 1, and FIG. 5 shows a status of the routes in which an auxiliary track 3 joins or merges with the main track 1. Referring to FIG. 5, to avoid collision or like interference of conveying vehicles 9 with each other, the main and auxiliary tracks 1 and 3 are each provided with a signaling unit 31 at a position slightly before the joining point of the main and auxiliary tracks 1 and 3, and before the signaling unit 31 on the main track 1, a passage sensor 33 is provided which detects the position of a conveying vehicle 9 approaching the joining point.

Figure 6:
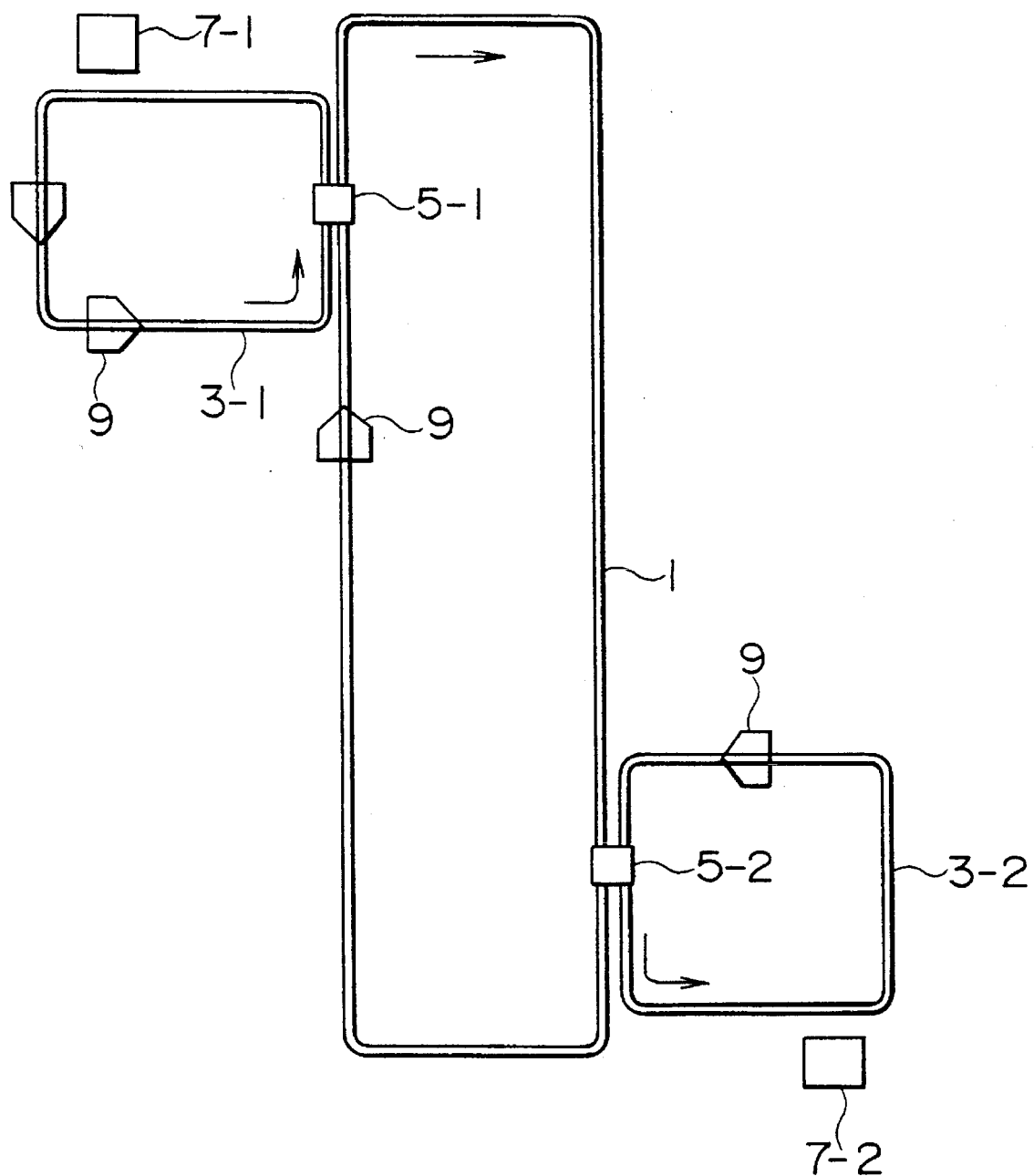
FIG. 6 is a schematic plan view similar to FIG. 1 but showing a procedure of conveyance according to the invention.
Figure 7:
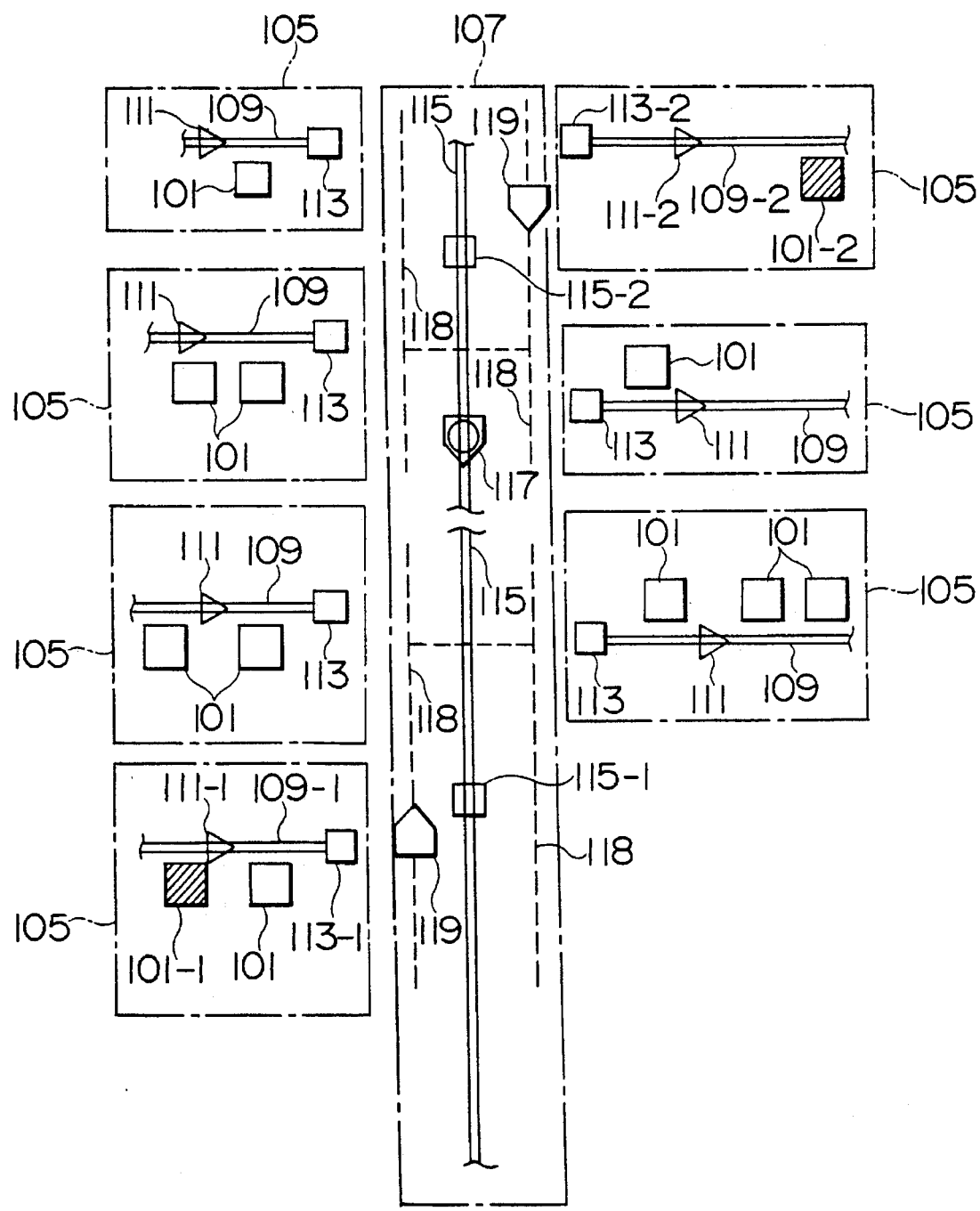
FIG. 7 is a schematic plan view showing a conventional automatic conveyance system.

FIG. 6 is a schematic plan view, partly omitted for simplification, of the system shown in FIG. 1.

An actual sequence of conveyance will now be described with reference to FIGS. 3 through 6. As an example, let us consider the case wherein cargo in the form of a partially fabricated product, which has been processed by a production apparatus 7-1 provided along an auxiliary track 3-1 in a source production area, is conveyed to a production apparatus 7-2 in a destination production area for the next processing, as shown in FIG. 6.

The completion of processing by the production apparatus 7-1 is reported to the production apparatus control computer 27, which is connected on-line to the production apparatus 7-1, whereupon the production apparatus control computer 27 determines the next production apparatus, among various production apparatus, for performing the next processing on the partially fabricated product while referring to processing flow data contained in a data base 29 (see FIG. 3) which is connected to the computer 27 and which include data for the production apparatus. Then, the computer 27 provides information concerning the thus determined production apparatus 7-2 for the next process to the conveyance control computer 21 via the LAN 25.

The conveyance control computer 21 finds out an idling conveying vehicle 9 which is not in any conveying operation and which is present on an auxiliary track 3-2 along which the production apparatus is disposed, and the computer 21 supplies to this vehicle 9 a command for conveying the partially fabricated product from the source production apparatus 7-1 to the destination production apparatus 7-2. The conveying vehicle 9, upon receipt of this command, is thereby controlled to go to the source production apparatus 7-1 where the cargo in the form of the partially fabricated product is loaded into that vehicle 9 by means of an unillustrated handling unit provided therein. Then, the conveying vehicle 9 travels on the source-side auxiliary track 3-1 to a coupler 5-1 through which it proceeds therefrom to the main track 1, so that it runs on the main track up to another coupler 5-2 for the destination-side auxiliary track 3-2, then proceeds from the main track 1 to that auxiliary track 3-2 via the coupler 5-2, and runs up to the destination production apparatus 7-2 where it is stopped. In this position, the conveying vehicle 9 unloads the cargo onto the production apparatus 7-2 using its own handling unit (not illustrated). Then, it reports the completion of the instructed conveyance to the conveyance control computer 21 which then communicates with the production apparatus control computer 27 via the LAN 25. The production apparatus control computer 27 then gives the production apparatus 7-2 a command for predetermined processing on the thus conveyed cargo, whereupon the instructed process is started. Next, a method of traffic control on conveying vehicles 9 at branching and joining points on the main and auxiliary tracks 1 and 3 will be described with reference to FIGS. 4 and 5. FIG. 4 shows a method of control at a branching point, and FIG. 5 shows a method of control at a joining point. In the case of FIG. 4, in which the conveying vehicle 9 passes the branching point of the main and auxiliary tracks 1 and 3, there is no possibility that the vehicle 9 collides or interferes with other vehicles. Thus, it is not necessary to temporarily stop the vehicle 9 just before the branching point, so the vehicle 9 is allowed to continuously run along the main track 1 or along the auxiliary track 3 depending on the status of connection of the tracks. On the other hand, in the case of FIG. 5, in which two vehicles 9 (i.e., one running on the main track 1 and the other on the auxiliary track 3) pass the joining point of the main and auxiliary tracks 1 and 3, control signals are supplied to the signaling units 31 which are provided on the joining tracks 1 and 3, respectively, at locations just before the joining point thereof such that one of the two signaling units 31 provides a pass command while the other unit provides a stop command, thus permitting only one of the vehicles 9 to pass through the joining point at a time. In this case, the signal control computer 28 effects control in such a manner that the earlier one of the vehicles 9, which is detected earlier than the other by the passage sensors 33, is permitted to first pass the joining point while temporarily stopping the other vehicle. After the passage of the earlier vehicle, the other later vehicle is then allowed to pass.

Since the plurality of auxiliary tracks 3 are connected with the single main track 1, as described before, traffic is generally greater on the main track 1 than on the auxiliary tracks 5. Therefore, at the joining point of the main and auxiliary tracks 1, 3, priority is preferably given to a vehicle 9 on the main track 1 rather than a vehicle 9 on an auxiliary track 3 when these vehicles are about to concurrently pass joining point. This priority serves to ensure smooth and continuous traffic on the main track 1.

The conveying vehicle 9, which has completed the conveying operation, is held stationary on the auxiliary track 3 and waits for the next command. When the ready-for-command vehicle 9 is deemed to interfere with another conveying vehicle 9 running on the same auxiliary track, it is moved along that auxiliary track 3 to a position free from mutual interference of the vehicles. This operation is performed in response to the detect,on of the approaching vehicle by an approach sensor 15 which is provided on the ready-for-command vehicle 9 itself, that is, it is effected without the need of intervention of the conveyance control computer 27.

In the above embodiment, the automatic conveying system is installed three-dimensionally in a space, which is a vacant space near the ceiling of the factory, so as to achieve effective utilization of the factory space. However, it is also possible to install the system on the floor as necessary.

Further, in the above description the main and auxiliary tracks 1 sad 8 are shown as one-way traffic tracks, but it is possible to adopt two-way traffic tracks as well.

As has been described in the foregoing, according to the present invention, a plurality of loop-shaped auxiliary tracks are provided along a loop-shaped main track such that they can be selectively coupled or de-coupled from the main track by means of couplers to enable a conveying vehicle to run continuously along auxiliary and main tracks. Thus, it is possible to convey cargo from a source-side auxiliary track via the main track to a destination-side auxiliary track by means of a single conveying vehicle without the need of any loading and unloading operations at intermediate points. Besides, unlike the prior art conveyance system, loading and unloading operations at intermediate points or waiting times for changing vehicles are not necessary, and thus it is possible to realize very quick conveyance operation. Further, such equipment as stockers, loading and unloading machines, etc., for tentatively stocking cargo or loading and unloading cargo for transfer between vehicles during the conveyance, are unnecessary. This means that the installation space for such equipment can be eliminated to permit effective utilization of the factory premises as well as good plant or factory layout with a high degree of space utilization.

What is claimed is:

1. An automatic conveyance system for transporting items among a plurality of production devices comprising:

a main track;

a plurality of auxiliary tracks, each auxiliary track having first and second ends and extending to one of a plurality of production devices;

couplers disposed at the first and second ends of the auxiliary tracks for coupling to the main track and de-coupling from the main track the first and second ends of the auxiliary tracks;

a plurality of vehicles running on the main and auxiliary tracks to convey items among the production devices;

a plurality of signaling units disposed on the main and auxiliary tracks adjacent each of the couplers for controlling passage of vehicles through the couplers;

a plurality of passage sensors disposed on the main track adjacent each of the couplers for sensing passage of vehicles, no passage sensors being disposed on the auxiliary tracks; and signal control means responsive to the passage sensors for controlling the signaling units to avoid a collision of vehicles when respective vehicles are concurrently approaching one of the couplers on the main track and on one of the auxiliary tracks.

2. An automatic conveyance system according to claim 1 wherein the signal control means controls the signaling units to give priority to a vehicle approaching a coupler on the main track over a vehicle approaching the same coupler on one of the auxiliary tracks.

3. An automatic conveyance system according to claim 1 comprising:

conveyance control means for supplying information designating respective source and destination production devices to the vehicles and for controlling overall conveyance operation of the vehicles; and production device control means connected to respective production devices for controlling the corresponding production devices.

4. An automatic conveyance apparatus according to claim 3 wherein the signal control means and the production device control means are connected to the conveyance control means via a local area network.

5. An automatic conveyance system for transporting items among a plurality of production devices in a factory, comprising:

a main track extending along a closed loop within a factory building containing a plurality of production devices;

a plurality of auxiliary tracks disposed in the factory, each of the auxiliary tracks extending along a closed loop past one of the production devices and having first and second ends;

a plurality of couplers installed along the main track, each coupler connected to the first and second ends of one of the auxiliary tracks for selectively coupling and decoupling the ends from the main track; and a plurality of conveying vehicles running on the main and auxiliary tracks for conveying items among the production devices, each conveying vehicle being capable of moving independently of any other of the vehicles on a same one of the tracks, and each said conveying vehicle being equipped with an approach sensor for sensing an approach from behind by another of the vehicles.

\* \* \* \* \*